Dec. 8, 1959 R. C. HEDRICK 2,916,315
PULLEY ATTACHMENT FOR A SHAFT
Filed July 2, 1956
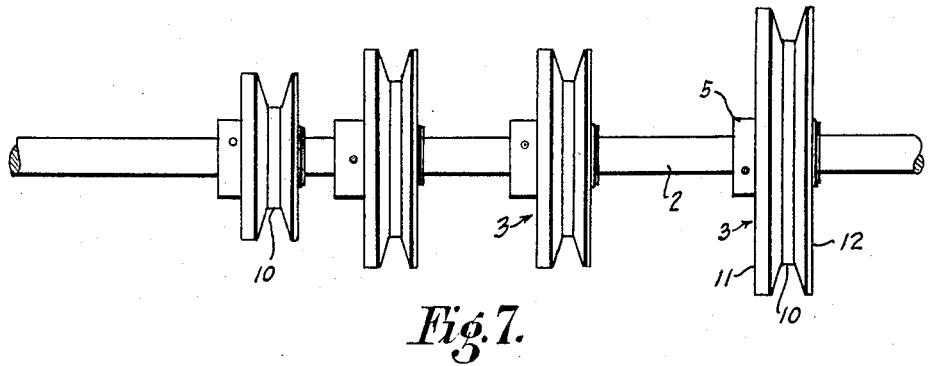
Fig.7.
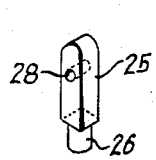
Fig.5.
Fig.4. 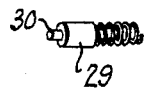 Fig.6.
Fig.1.
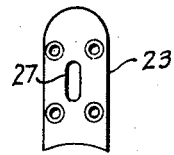
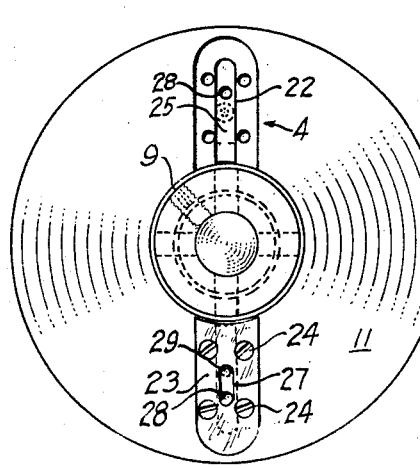
Fig.2.
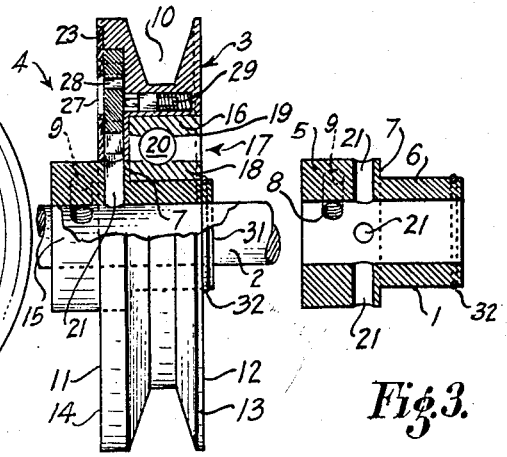
Fig.3.
INVENTOR
Raymond C. Hedrick
BY
A. Schapp.
ATTORNEY

2,916,315
PULLEY ATTACHMENT FOR A SHAFT

Raymond C. Hedrick, San Francisco, Calif.

Application July 2, 1956, Serial No. 595,141

1 Claim. (Cl. 287—52)

The present invention relates to improvements in a pulley attachment for a shaft, and its principal object is to provide means whereby a wheel or pulley mounted upon a shaft may be quickly and easily attached thereto for establishing driving relation and may be readily detached for idling.

My invention is particularly intended for use in connection with a line shaft which usually has a number of pulleys mounted thereon, with belt drives for the pulleys, and in which it is desired to use selected pulleys at one time only. My arrangement makes it possible to quickly detach any pulleys not in use from the line shaft without disturbing the belt drive.

In its general features my invention comprises a collar slidable on the shaft and having means for fastening the same upon the shaft at any desired point, a pulley having a bearing revolvable on the collar, and cooperative means on the collar and the pulley for connecting and disconnecting the latter.

It is further proposed in the present invention, to arrange the pulley, the bearing, and the attaching means as a unitary structure removable from the collar so that the same pulley structure may be used for shafts of different diameters, the only change involved being the selection of a collar having the proper inside diameter corresponding to that of the shaft.

It is still further proposed to use a collar adapted for fastening upon the shaft and having a shoulder thereon, a pulley having a bearing mounted therein and adapted to be pushed up against the shoulder, and cooperative means on the shoulder and on the pulley for releasably locking the pulley to the shoulder.

And finally, it is proposed to arrange the interlocking means in such a manner that it is entirely concealed within the pulley, so that there are no projecting parts which might injure the hands or clothing of the operator upon accidental contact.

Further objects and advantages of my invention will appear as the specification proceeds, and the new and useful features of the same will be fully defined in the claim attached hereto.

The preferred form of my invention is illustrated in the accompanying drawing forming part of this application, in which:

Figure 1 is an end view of my pulley as attached to a shaft, a portion being shown in section;

Figure 2, a side view of the pulley with one face plate removed;

Figure 3, a longitudinal section through a collar used in my invention;

Figure 4, a perspective view of a latch member;

Figure 5, a perspective view of a spring-pressed plunger;

Figure 6, a front view of a face plate used in my invention; and

Figure 7, a front view of a line shaft having a number of my pulleys attached thereto.

While I have shown only the preferred form of my invention, it should be understood that various changes or modifications may be made within the scope of the claim hereto attached, without departing from the spirit of the invention.

Referring to the drawing in detail, my invention comprises in its principal features, a collar 1 slidable on a shaft 2 which latter may be mounted as a line shaft adapted for receiving a number of collars thereon, a pulley 3 slidable on the collar, and means generally shown at 4 for interlocking the pulley with the collar.

The collar 1, shown in detail in Figure 3, has a sliding fit on the shaft and is stepped to present a major section 5 and a minor section 6 forming a shoulder 7 with the major section.

The collar is formed with a threaded hole 8 adapted to receive a set screw 9 by means of which the collar may be secured upon the shaft at any point desired.

The pulley 3 may be generally of conventional construction, with an annular groove 10 and parallel side faces 11 and 12. It should be noted, however, that the pulley wall 13 on one side of the groove is relatively thin, while the pulley wall 14 on the other side of the groove is much heavier, this wall being used for accommodating and concealing therein the latch mechanism to be described. Except for the groove, the pulley is of uniform diameter, as shown.

The pulley is formed, inside of the heavy wall 14, with a central aperture 15 fitting over the major section 5 of the collar, and inside of the remainder of the pulley, with an enlarged central aperture 16 adapted to accommodate the ball bearing 17, comprising an inner race 18, an outer race 19 and a series of balls 20 interposed between the two races.

The inner race has a sliding fit with the minor section 6 of the collar and is made to bear against the shoulder 7 of the collar when the pulley and the collar are in assembled relation. In this position the heavy wall of the pulley projects over an adjacent portion of the major section of the collar. The latter is formed, inside the confines of the heavy wall 14, with a series of radial holes 21.

Two identical latch mechanisms 4 are accommodated in the heavy wall 14 in diametrically opposed relation. For the purpose, the said wall is formed with two identical radial grooves 22, rectangular in cross-section, and extending from points close to the periphery to the central aperture, the grooves being alined with one another.

The borders of the grooves are recessed slightly to receive face plates 23 which are secured upon the recessed portions by means of screws 24. The upper face plate in Figure 2 has been removed to more clearly show the construction below. The outer faces of the face plates are made to come flush with the outer face of the pulley.

Each of the grooves 22 has a latch member 25 slidable therein, the latch members being rectangular in cross-section and having a sliding fit in the grooves underneath the face plates.

The latch members are the same length as the grooves, so that they can be entirely accommodated therein, but have short cylindrical ends 26 adapted to be received in the holes 21 of the collar when the latches are pushed inwardly.

For operating each latch member I provide a short lengthwise slot 27 in each face plate, immediately over the groove, and a transverse hole 28 in the latch member, so that the operator, by means of a nail or other similar instrumentality inserted through the slot into the hole may push the latch member forward and backward. This structure leaves the entire surface of the pulley unobstructed.

To lock each latch member against outward movement, due to centrifugal force, I provide a positive lock in the form of a spring-pressed plunger 29 mounted underneath the latch in a transverse cylindrical hole extending into the body of the pulley from the bottom of the groove.

The plunger 29 is located underneath the inner end of the slot 27 and is depressed by the latch when the latter is in inactive position. But, when the latch is moved inward, into active position, the hole 28 moves over the plunger and allows the latter to be forced into the hole by its spring to provide a positive lock. It will be noted that the projecting end 30 of the plunger, which enters the hole, is straight cylindrical, so that it cannot be crowded out of the hole by centrifugal force.

When the operator desires to pull the latch back to inactive position, he merely pushes his nail through the slot 27 into the hole 28, thereby pushing back the plunger and freeing the latch for outward movement.

In operation, any desired number of my pulley attachments may be mounted on the line shaft 2, and may be secured upon the shaft in selected positions, to line up with driven pulleys, by tightening the set screw 9 of each collar upon the shaft.

With the latches 25 in retracted position, all the pulleys are free to revolve on their respective collars, the plungers 29 being held in retracted position by the latches, and the holes 28 in the latches being located under the outer ends of the slots 27 in the face plates, while the plungers are disposed under the inner ends of the slots 27.

When it is desired to establish driving relation between any of the pulleys and its collar, the operator inserts a nail or similar tool through the slot 27 into the hole 28 in the latch and pushes the latter inwardly for engagement into one of the holes 21 in the collar.

At the end of this movement, the hole 28 of the latch member moves over the plunger 29, and the latter is forced into the hole by its spring, thus positively locking the latch against outward movement due to centrifugal force.

When the operator desires to disconnect the pulley from the collar, he merely inserts his nail or other tool through the inner end of the slot 27 into the hole 28 in the latch, pushing back the plunger into inactive position, and then retracts the latch by an outward push.

Thus each pulley may be readily locked and unlocked from the collar by a simple latch movement, all the parts of the latch mechanism being concealed between the side faces of the pulley.

For positively locking the pulley to the collar against endwise movement, the minor section 6 of the collar may be made to slightly project beyond the face of the pulley, as at 31, and may be formed with an annular groove outside of the face of the pulley to receive a split ring 32 bearing on the outer face of the pulley bearing.

I claim:

A pulley attachment for a shaft, comprising a collar slidable on the shaft and having a minor section and a major section forming a shoulder therewith, means for anchoring the collar to the shaft, a pulley comprising a single, unitary and solid cylindrical block of generally uniform diameter and having parallel end faces and having an annular groove in the circumference thereof off-set with respect to a median transverse plane, so as to have a relatively thin wall on one side of the groove and a relatively heavy wall on the other side of the groove, the pulley being slidable on the collar and having an axially fore-shortened bearing movable up against the shoulder with the thin wall in registry with the end face of the minor section of the collar and the heavy wall projecting over the major section of the collar, and cooperative means associated with the heavy wall and the major collar section for releasably interlocking the pulley with the major section of the collar, the said means comprising a radial socket formed in said major section and a latch member slidable in a radial groove in the face of the heavy wall of the pulley and alignable with the socket for engagement thereinto with means carried by the pulley for automatically locking the latch member in socket engaging position against outward movement due to centrifugal force.

References Cited in the file of this patent

UNITED STATES PATENTS

| 35,622 | Platt | June 17, 1862 |
|---|---|---|
| 209,712 | Pratt | Nov. 5, 1878 |
| 226,113 | Rominger | Mar. 30, 1880 |
| 361,323 | Rochow | Apr. 19, 1887 |
| 363,006 | Shamp | May 17, 1887 |
| 831,745 | Rice | Sept. 25, 1906 |
| 999,088 | Beede et al. | July 25, 1911 |
| 1,049,984 | Bowers | Jan. 7, 1913 |
| 1,143,928 | Anderson | June 22, 1915 |
| 1,393,610 | Candee | Oct. 11, 1921 |
| 1,590,153 | Drucker | June 22, 1926 |
| 1,693,538 | Allen | Nov. 27, 1928 |
| 2,025,834 | Tautz | Dec. 31, 1935 |
| 2,755,675 | Abel | July 24, 1956 |

FOREIGN PATENTS

| 39,876 | Austria | Nov. 25, 1909 |